Feb. 28, 1950 R. M. DILWORTH 2,499,300
LOCOMOTIVE COUPLING DEVICE
Filed Feb. 23, 1946 3 Sheets-Sheet 2
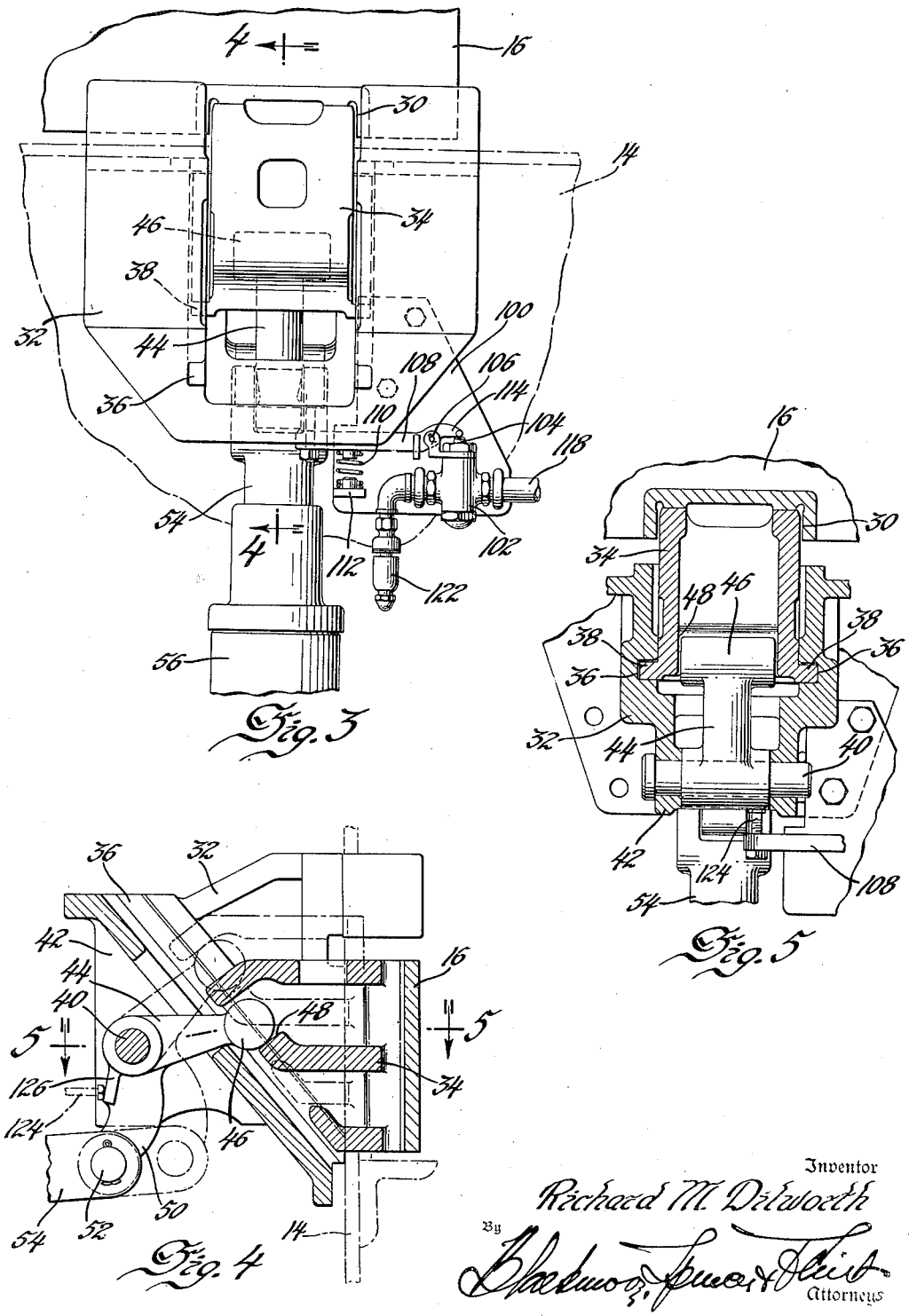

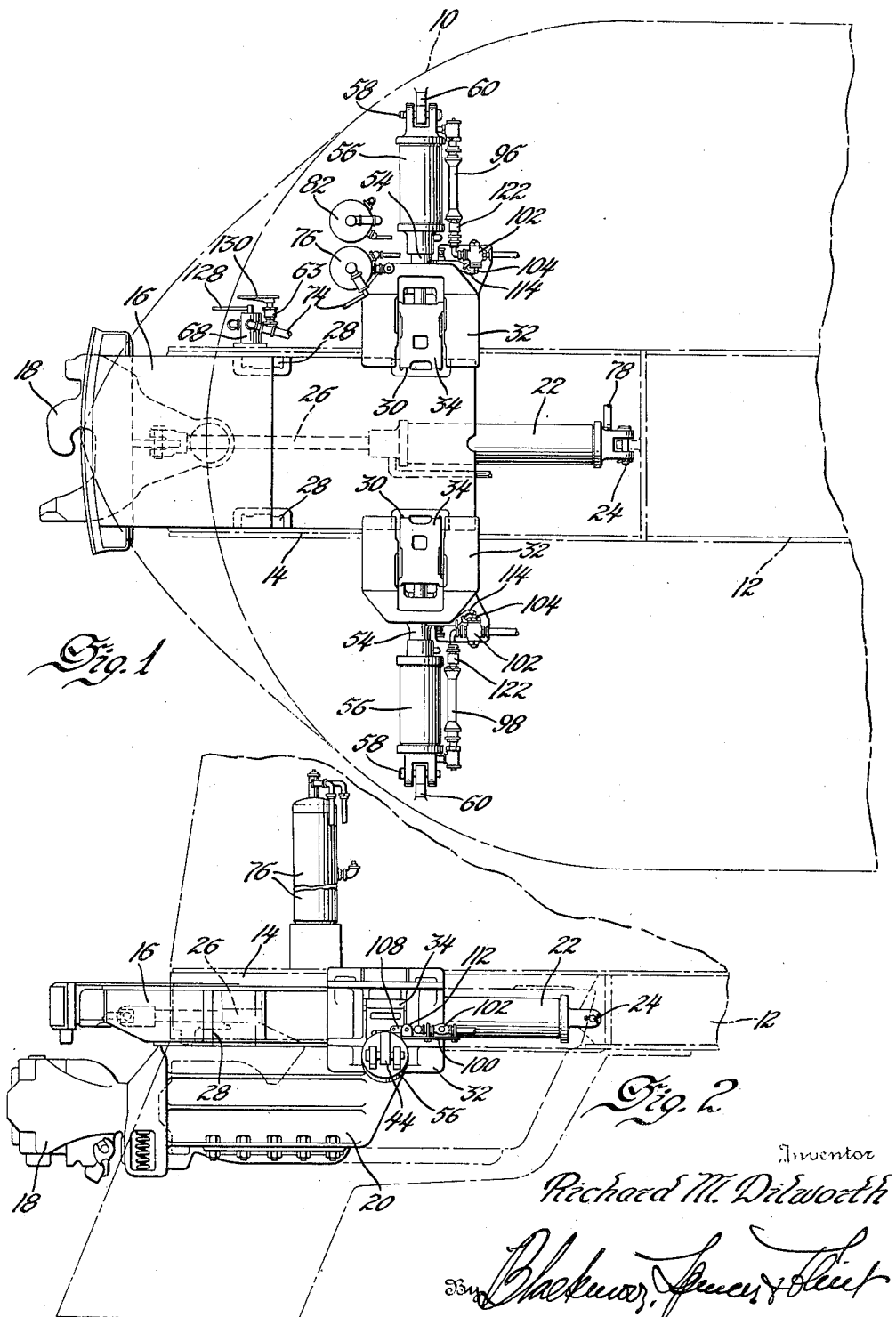

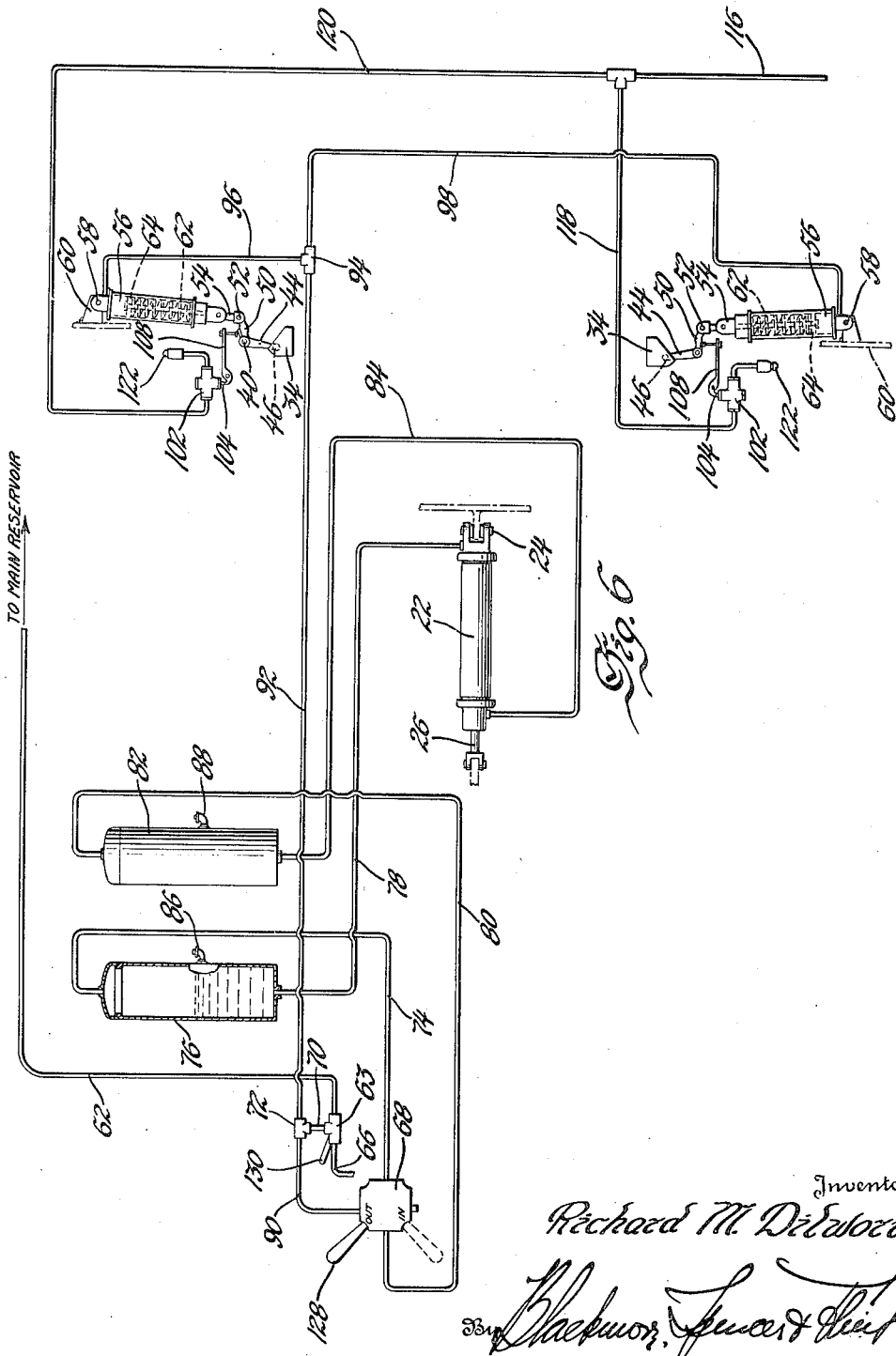

Patented Feb. 28, 1950

2,499,300

UNITED STATES PATENT OFFICE 2,499,300

LOCOMOTIVE COUPLING DEVICE

Richard M. Dilworth, Hinsdale, Ill., assignor to General Motors Corporation, Detroit, Mich., a corporation of Delaware Application February 23, 1946, Serial No. 649,692

5 Claims. (Cl. 213—4)

This invention relates to locomotive coupling devices of the type which may be moved to a retracted position when they are not being used, in order to get them out of the way for safety reasons and to improve the appearance of the front end of the locomotive.

Such coupling devices are necessarily of very heavy construction, and it is common practice to provide power means to move them to either extended or retracted position. It is essential that such coupling devices be positively locked in place when in either extended or retracted position, and since when the locomotive is coupled to a car or other locomotive, the pulling and buffing loads which must be transmitted to the locomotive frame through the coupling device are often very heavy, the locking means which serves to hold the coupling device in extended position must be of very sturdy and therefore necessarily heavy construction, with the result that it would be very difficult to move out of or into locking position manually. Therefore power means are provided to withdraw or insert the lock out of or into engagement with the coupling device.

For safety reasons, it is important that some means be provided to insure that the locking device is in locking position before a coupling is made to a car or to another locomotive, as if it were not and an attempt should be made to operate the locomotive, the coupling device would either be pulled completely out of the locomotive or other damage would result.

It is therefore an object of this invention to provide means for insuring that the coupler locking means is in locking engagement with the coupling device before a coupling is made to a car or another locomotive. This means consists of an audible signal, such as a whistle, which is so connected with the controls for actuating the power means for moving the coupler to extended or retracted position, and with the power means for shifting the locking device out of or into locking engagement with the coupler, that it will automatically produce a warning signal whenever the locking device is out of engagement with the coupler, and can only be shut off by setting the control valve to a position which will move the locking device into engagement with the coupler. This signal is sufficiently loud that it is certain to be heard both inside and outside of the locomotive body, and should the trainman making the coupling forget to move the control to a position which will cause the coupling device to be positively locked in position, the locomotive operators and everyone else in the vicinity will be given a warning thereof, which warning can only be discontinued by moving the control valve to a position wherein the lock will be placed in engagement with the coupling device.

Other objects and advantages of the invention will be apparent upon reference to the description and accompanying drawings, in which Fig. 1 is a plan view of the front end portion of a locomotive body, the outline of the latter being shown in dot-and-dash lines, showing my invention associated therewith.

Fig. 2 is a side elevational view of the structure shown in Fig. 1.

Fig. 3 is a plan view, on a larger scale, of the coupler locking mechanism.

Fig. 4 is a sectional view, taken on the line 4—4 of Fig. 3.

Fig. 5 is a sectional view, taken on the line 5—5 of Fig. 4.

Fig. 6 is a diagrammatic view showing the arrangement of piping, control valves and other parts of the mechanism.

The reference numeral 10 indicates in dot-and-dash lines the outline of the body of a locomotive of the Diesel-electric type, 12 being the underframe thereof. 14 is a buffer housing which is built into the underframe, and slidably supported in this housing is a buffer 16, to the underside of which is connected a coupler 18, which is adapted to slide back and forth in a draft gear pocket 20 which is supported from the underframe.

While the coupler is normally held in retracted position in the pocket, it sometimes becomes necessary to couple the front end of the locomotive to a car or another locomotive, in which case the coupler must be moved to extended position, in which it is shown in Figs. 1 and 2. Because of the great weight of the coupler, it is desirable that power means be provided to move it to extended or retracted position. Such power means in this structure consists of a hydraulically actuated cylinder 22, which is pivotally secured to the underframe at 24, and which has a piston rod 26 which is connected to the sliding buffer 16 in any suitable manner.

It is essential that the coupler be positively locked in place when it is in either extended or retracted position. To accomplish this, two slots 28 and 30 are formed in each side of the sliding buffer 16. Secured to the underframe at each side of the buffer is a lock pocket 32 in each of which is slidably supported a lock member 34. As shown in Fig. 4, these pockets have formed in them grooves or ways 36 which are inclined downwardly toward the buffer, and guide portions 38 extending from each side of the lock member fit into these ways. Pivotally mounted on a pin 40, which is supported in projections 42 extending from the pocket is an arm 44 which has a cylindrical portion 46 provided on one end, which portion fits into a recess 48 formed in the lock member 34.

The opposite end 50 of each of the arms 44 is connected by a pin 52 to a piston rod 54 which extends from an air cylinder 56, which is pivotally connected at 58 to a bracket 60 secured to the underframe. In each of the cylinders there is a compression spring 62 located between one end of the cylinder and the piston 64, the spring normally tending to move the piston and rod into a cylinder, which results in the arm 44 being swung in a direction about its pivot 40 wherein the cylindrical portion 46 will be swung downwardly, thereby causing the lock member 34 to slide downwardly in the ways 36 and to thereby be moved inwardly into either the slot 28 or 30.

When the coupler is in extended position, as shown in Figs. 1 and 2, the lock members 34 fit into the slots 30 on each side of the sliding buffer to positively lock the buffer and the coupler in that position. It will be noted that the lock members are of very heavy construction, since they must be able to withstand the pulling and buffing forces, which are often very substantial. It is because the lock members must necessarily be of heavy construction that power means such as the air cylinders 56 are provided to move them out of locking position, since it would be very difficult to do this manually. When the coupler is in retracted position the lock members fit into the slots 28 on either side of the buffer.

To control the operation of the coupler locking and extending and retracting mechanism, the following described arrangement of piping, valves and other apparatus, which is shown diagrammatically in Fig. 6, is employed. 62 is a pipe leading to a source of supply of compressed air, which may be the main reservoir of compressed air for the locomotive. This pipe is connected to a three-way valve 63, of conventional construction, which has a vent pipe 66 leading to atmosphere and another pipe 70 connected to a T-fitting 72 which is connected by a pipe 90 to a four-way valve 68, which is also of conventional construction. From the four-way valve 68 a pipe 74 leads into the top of an oil reservoir 76 which is partially filled with oil. A pipe 78 conducts oil from the bottom of reservoir 76 into the rear end of cylinder 22.

Another pipe 80 leads from the four-way valve 68 into the top of another oil reservoir 82, which is likewise partially filled with oil, a pipe 84 conducting oil from the bottom of this tank to the front end of cylinder 22. The reservoir 76 has a filling elbow 86 and the tank 82 a similar elbow 88 for maintaining the proper level of oil therein.

As previously mentioned leading from one end of the fitting 72 to the four-way valve 68 is a pipe 90, while a pipe 92 extends from the opposite end to another T-fitting 94. One pipe 96 leads from this fitting into the outer end of the cylinder 56 on one side of the locomotive, while another pipe 98 leads from this fitting into the outer end of the cylinder 56 on the opposite side thereof. Both the three-way valve 63 and the four-way valve 68 are mounted on the side of the buffer housing, as shown in Fig. 1, where they will be accessible from the front and side of the locomotive.

Secured to each of the locking member pockets is a plate 100 upon which is mounted a whistle controlling valve 102, which is simply a well-known type of air valve having a plunger 104 extending therefrom, the plunger being urged outwardly by spring means located within the valve. When the plunger moves to the outward position, the valve is closed, but when the plunger is depressed against the spring action, the valve is opened to let air pressure therethrough. Pivotally supported at 106 on each of these valves is a lever 108 which is normally urged by a compression spring 110, which seats against an abutment 112 on the plate, to a position wherein the short end 114 of the lever, which bears against the end of the plunger 104, will force the latter inwardly into the valve to hold it in open position. Compressed air from the main reservoir is supplied to these valves by pipes 116, 118 and 120. Connected to the opposite end of each valve is a whistle 122 which is adapted to be operated by the compressed air. Secured to the end of the lever 108 is a member 124 which is adapted to be engaged by a lug 126 on the arm 44 when the latter is in the down position wherein the member 34 is held in locking position in either the slot 28 or 30. This results in the lever 108 being moved against the action of spring 110 to a position wherein it will permit the plunger 104 of the valve to move outwardly, thereby closing the valve. However, when the arm 44 is swung upwardly to move the locking member 34 out of the slot it is in, the lug 126 is moved away from the member 124 which allows the spring 110 to swing the lever 108 to a position wherein the end 114 thereof will depress the plunger 104 thereby opening the valve. In other words, when the member 34 is in locking position, the whistle valve will be closed, and all of the time it is in unlocking position, the valve will be open, for reasons to be presently explained.

To operate the mechanism, assuming that the coupler is in retracted position, which is its normal position, the handle 128 of the four-way valve 68 is first set to the "out" position shown in full lines in Fig. 6, and then the handle 130 of the three-way valve 63 is set to a position which will permit compressed air to flow through pipe 70 into both pipes 90 and 92. The air from the pipe 92 will flow through pipes 96 and 98 into both of the cylinders 56, causing the pistons 64 therein to compress the springs 62 and to be moved outwardly, it being understood that there is a vent opening in each of the cylinders on the opposite side of the pistons to permit the air on that side to escape. This movement swings the arms 44 around, and through the engagement of the circular portions 46 in the recesses 48 of the locking members 34, causes the latter to be moved upwardly and outwardly in the pockets 32 so that they move out of the slots 30, thereby unlocking the coupling device.

As previously explained, as soon as the locking members 34 move upwardly out of the slots, the whistle valves on each side are moved to open position by the springs 110 and levers 108, thereby permitting compressed air to enter the whistles to produce an audible signal. This signal will continue as long as either of the members 34 are out of locking position, and can only be shut off by moving both of them back into locking position.

At the same time as the members 34 are being moved out of locking position, the compressed air flows through pipe 90 and through valve 68 into pipe 74 which conducts it into the air chamber at the top of reservoir 76. This forces oil out through the pipe 78 into the rear end of the cylinder 22, which oil acting on the piston in that cylinder, forces the piston rod 26 outwardly and forwardly, and since the latter is connected to the sliding buffer, the member and the coupler which is secured thereto, are moved forwardly to extended position.

While the compressed air is being utilized to both move the lock member 34 out of engagement with the buffer and to move the latter forwardly the lock member will be moved out of engagement with the buffer before the latter starts to move, due to the fact that the compressed air acts directly on the pistons in the cylinders 56, whereas it has to build up a pressure in the reservoir 76 before it can force oil to the cylinder 22, so that there is a slight lag in this latter operation, which insures that the lock member will always be moved out of engagement with the sliding buffer before the cylinder 22 can tend to move the buffer. During the operation just described, as the piston in the cylinder 22 is moved outwardly by the oil pressure, the oil which is in that cylinder on the opposite side of the piston is forced back through pipe 84 into the bottom of reservoir 82, the air from the top of the latter being forced through pipe 80 and valve 68 and escaping through a vent passage 66 therein.

After the coupler has reached extended position, it must be locked in that position. To do that, the operator moves the handle 130 of the three-way valve to a position which will shut off the flow of compressed air to the cylinders 56, and thereafter the compression springs 62 in those cylinders will start forcing the pistons 64 further into the cylinders, the air which is in the cylinders on that side of the pistons being permitted to escape through the vent passage 66. This movement of the pistons 64, acting through the piston rods 54 and arms 44, causes the members 34 to be swung downwardly into the slots 30. When they have reached the limit of their downward movement into those slots, the lugs 126 will engage the members 124 to move the levers 108 to a position wherein the plunger 104 may move out of the valves 102 to close the latter, thereby shutting off the supply of compressed air to the whistles.

When the coupler is to be moved to retracted position, the handle 128 of the four-way valve 68 is moved to the "in" position shown in dotted lines in Fig. 6, and the handle 130 of the valve 63 is then moved to a position wherein compressed air from the main reservoir will again flow simultaneously both into the pipes 92, 96, 98 and cylinders 56 to move the members 34 out of locking position, as previously described, and into the four-way valve 68 which then is in such position that the air will flow out through pipe 80 into the top of reservoir 82, which will force oil from the lower part thereof through the pipe 84 into the front end of the cylinder 22, thereby causing the coupling device to be moved inwardly into retracted position. While this movement is taking place, the oil in the rearward end of the cylinder 22 is being forced by the piston back through the pipe 78 into the lower part of the reservoir 76, the air from the top of that reservoir escaping through pipe 74, valve 68 and vent passage 66.

During this operation, since the members 34 are held out of locking position, the whistles 122 will both be giving a warning signal, which will continue until at the end of the retracting movement, the trainman moves the handle 130 of the valve 63 to a position which will shut off the flow of air to the cylinders 56 and will allow the air which is in those cylinders to escape through the vent passage 66, as previously described. The springs 62 in the cylinders will there again move the pistons 64 into the cylinders, causing the members 34 to again be moved into locking position in the slots 30, at the end of which movement the whistle valves 102 will be closed to shut off the warning signal.

It will be seen from the above that the controls for operating the coupler extending and retracting mechanism and the locking means therefor are so combined that the latter is certain to be shifted out of locking position before the coupler starts to move, and that whenever the locking means is out of locking position, an audible warning signal will be given, which will indicate to the operator and trainmen that the coupler is not in proper condition to render it safe to start the locomotive.

While a specific embodiment of the invention has been shown and described, it will be understood that various changes in size, shape and arrangement of the parts may be made without departing from the spirit and scope of the appended claims.

I claim:

1. In combination, a locomotive underframe, a coupling device mounted for longitudinal movement in said underframe to extended or retracted positions therein, means secured to said underframe adjacent to said coupling device forming a pocket having inclined ways therein, and a member supported in said pocket and having portions which are guided in said ways whereby as the member slides downwardly therein, it will be moved into engagement with the coupling device to lock the latter in either extended or retracted position.

2. In combination, a locomotive underframe, a coupling device mounted for longitudinal movement in said underframe to extended or retracted positions therein, means secured to said underframe adjacent to said coupling device forming a pocket having inclined ways therein, a member supported in said pocket and having portions which are guided in said ways whereby as the member slides downwardly therein, it will be moved into engagement with the coupling device to lock the latter in either extended or retracted position, and power means adapted to move said member upwardly in said pocket whereby it will be moved out of engagement with the coupling device when it is desired to change the position of the latter.

3. In combination, a locomotive underframe, a coupling device mounted for movement in said underframe to extended or retracted positions therein, hydraulically operated power means adapted to move said coupling device to either of said positions, a member serving to lock said coupling device in either of said positions, and compressed, air operated power means adapted to move said member out of locking position, separate reservoirs partially filled with hydraulic fluid and connected in reverse relation with said hydraulically operated power means, valve means for directing air pressure to one or the other of said reservoirs, a source of air pressure and a pressure application and relief valve between said source and said air operated power means and said valve means to cause operation of said air operated power means and said hydraulically operated power means successively in order to cause movement of said member to unlock said device prior to movement of said device with respect to said locomotive underframe.

4. In a railway vehicle having a source of air pressure and an underframe, a housing secured to said underframe, a buffer and coupler mechanism movably mounted in said housing, a slow acting reversible pressure operated means for moving said mechanism to extended and retracted positions relative to said housing, a reversing valve for controlling said reversible slow acting pressure operated means, lock means movable with respect to said housing, spring means normally holding said lock means in locking engagement with said buffer when in the extended and in the retracted positions, quick acting pressure operated means for moving said lock means out of locking engagement with said buffer, a pressure application and relief valve connected between said pressure source and said reversing valve and said quick acting pressure operated means, and a signal valve connected to said pressure source and operable by movement of said lock means out of locking engagement with said coupler.

5. In a railway vehicle having a source of air pressure and an underframe, a housing secured to said underframe, a buffer and coupler mechanism longitudinally movable in said housing and having longitudinally spaced locking slots, reversible pressure operated means for moving said mechanism between extended and retracted positions relative to said housing, locking means movable in said housing, spring means urging said locking means into said locking slots to hold said mechanism in either the extended or retracted position, pressure operated means for moving said locking means out of said locking slots in said mechanism, a warning signal control valve movable to an open position by unlocking movement of said locking means and pipe connections from said pressure source to said signal control valve including an application and relief valve to apply and relieve pressure from said power operated means for said locking means, a reversing valve and a reservoir in series relation between said reversible pressure operated means and said application and relief valve to cause unlocking of said mechanism locking means prior to operation of said reversible power operated means for moving said mechanism to the extended or retracted position.

RICHARD M. DILWORTH.

REFERENCES CITED

The following references are of record in the file of this patent:

UNITED STATES PATENTS

| Number | Name | Date |
|---|---|---|
| 462,078 | Granger | Oct. 27, 1891 |
| 541,907 | Watson | July 2, 1895 |
| 550,836 | McDonald | Dec. 3, 1895 |
| 776,341 | Moser | Nov. 29, 1904 |
| 948,848 | Coyne | Feb. 8, 1910 |
| 960,742 | Vissering | June 7, 1910 |
| 1,098,021 | Davidson et al. | May 26, 1914 |
| 1,432,078 | Miller | Oct. 17, 1922 |
| 2,209,229 | Kjolseth | July 23, 1940 |
| 2,239,427 | Kjolseth | Apr. 22, 1941 |
| 2,244,002 | Dilworth | June 3, 1941 |